(12) United States Patent
McWethy

(10) Patent No.: US 10,073,752 B2
(45) Date of Patent: Sep. 11, 2018

(54) UNIVERSAL SMART CONNECTION PAD

(71) Applicant: Chris McWethy, Minneapolis, MN (US)

(72) Inventor: Chris McWethy, Minneapolis, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 140 days.

(21) Appl. No.: 14/994,418

(22) Filed: Jan. 13, 2016

(65) Prior Publication Data

US 2017/0199799 A1    Jul. 13, 2017

(51) Int. Cl.

| | |
|---|---|
| *G06F 13/38* | (2006.01) |
| *G06F 11/30* | (2006.01) |
| *G06F 11/22* | (2006.01) |
| *G06F 11/14* | (2006.01) |
| *H01R 13/64* | (2006.01) |
| *H01R 13/62* | (2006.01) |
| *H01R 13/641* | (2006.01) |
| *H01R 13/642* | (2006.01) |
| *G06F 13/40* | (2006.01) |
| *H01R 31/06* | (2006.01) |

(52) U.S. Cl.
CPC ...... *G06F 11/3051* (2013.01); *G06F 11/1443* (2013.01); *G06F 11/2221* (2013.01); *G06F 11/2289* (2013.01); *G06F 13/385* (2013.01); *H01R 13/64* (2013.01); *G06F 13/4068* (2013.01); *H01R 13/6205* (2013.01); *H01R 13/641* (2013.01); *H01R 13/642* (2013.01); *H01R 31/06* (2013.01); *H01R 31/065* (2013.01)

(58) Field of Classification Search
CPC .......... H04Q 2213/1302; G06F 13/382; G06F 13/385; G06F 13/4068; G06F 13/4081; G06F 13/409; H01R 13/62; H01R 13/6205; H01R 13/64; H01R 13/641; H01R 13/642; H01R 31/06; H01R 31/065
See application file for complete search history.

(56) References Cited

U.S. PATENT DOCUMENTS

| | | |
|---|---|---|
| 4,689,023 A | 8/1987 | Strong, III et al. |
| 5,426,738 A | 6/1995 | Hsieh et al. |
| 5,784,511 A | 7/1998 | Kikuchi et al. |
| 5,829,987 A | 11/1998 | Fritsch et al. |
| 6,761,580 B2 | 7/2004 | Chang |

(Continued)

OTHER PUBLICATIONS

Wikipedia's USB-C historical version published Jaunary 7, 2016 https://en.wikipedia.org/w/index.php?title=USB-C&oldid=698715241 (Year: 2016).*

(Continued)

*Primary Examiner* — Joseph O Schell
(74) *Attorney, Agent, or Firm* — Tysver Beck Evans, PLLC

(57) ABSTRACT

The present invention is a pad for connecting a host device to a slave device through a slave adapter. The host may provide services to the slave, including power and data connections. Pins in the pad magnetically align the slave adapter. The host and slave may collaborate on which pins are assigned to connections. The system handles various usage modifications including, for example, dislocation of the slave adapter, and changes in pin assignments.

19 Claims, 11 Drawing Sheets

(56) References Cited

U.S. PATENT DOCUMENTS

| | | | |
|---|---|---|---|
| 6,825,689 B1* | 11/2004 | Snyder | G06F 13/4072 |
| | | | 326/37 |
| 6,981,895 B2 | 1/2006 | Potega | |
| 7,311,526 B2 | 12/2007 | Rohrbach et al. | |
| 7,479,019 B2 | 1/2009 | Kent et al. | |
| 7,658,613 B1 | 2/2010 | Griffin et al. | |
| 7,726,973 B1 | 6/2010 | Perry | |
| 7,874,844 B1 | 1/2011 | Fitts, Jr. | |
| 7,912,501 B2 | 6/2011 | Capece et al. | |
| 7,967,609 B2 | 6/2011 | Nishihira et al. | |
| 8,105,091 B2 | 1/2012 | Nishihira et al. | |
| 8,195,852 B2 | 6/2012 | Tantos et al. | |
| 8,341,584 B1* | 12/2012 | Vaduvatha | G06F 12/00 |
| | | | 716/113 |
| 8,398,409 B2 | 3/2013 | Schmidt | |
| 8,469,730 B2 | 6/2013 | Garb et al. | |
| 8,629,580 B2 | 1/2014 | Johnson et al. | |
| 8,686,600 B2 | 4/2014 | Terlizzi et al. | |
| 8,838,868 B2 | 9/2014 | Tippett | |
| 8,894,419 B1 | 11/2014 | Buelow | |
| 8,936,472 B1* | 1/2015 | Gibboney, Jr. | H01R 13/64 |
| | | | 439/39 |
| 9,419,376 B1* | 8/2016 | Blum | H01R 13/6205 |
| 9,614,322 B1* | 4/2017 | Gibboney, Jr. | H01R 13/6205 |
| 2002/0108006 A1* | 8/2002 | Snyder | G06F 1/08 |
| | | | 710/100 |
| 2003/0098661 A1 | 5/2003 | Stewart-Smith | |
| 2004/0145244 A1* | 7/2004 | Gan | G06F 13/4086 |
| | | | 307/116 |
| 2005/0032405 A1 | 2/2005 | Wu | |
| 2006/0156142 A1* | 7/2006 | Gabrielson | G01R 31/31704 |
| | | | 714/742 |
| 2007/0259536 A1 | 11/2007 | Long et al. | |
| 2008/0096398 A1 | 4/2008 | Rohrbach et al. | |
| 2010/0311261 A1 | 12/2010 | Lee | |
| 2011/0143556 A1 | 6/2011 | Hsu | |
| 2012/0021619 A1 | 1/2012 | Bilbrey et al. | |
| 2012/0148196 A1 | 6/2012 | Penumatcha et al. | |
| 2013/0159559 A1 | 6/2013 | Hess | |
| 2013/0305066 A1* | 11/2013 | Mullins | G06F 1/266 |
| | | | 713/310 |
| 2014/0181328 A1 | 6/2014 | Terlizzi et al. | |
| 2014/0235075 A1 | 8/2014 | Kim et al. | |
| 2016/0156137 A1* | 6/2016 | Pan | G06F 13/385 |
| | | | 439/78 |
| 2016/0364360 A1* | 12/2016 | Lim | G06F 13/385 |
| 2016/0378704 A1* | 12/2016 | Adamson | G06F 13/364 |
| | | | 710/104 |
| 2017/0052918 A1* | 2/2017 | Wang | H01R 29/00 |

OTHER PUBLICATIONS

Dec. 24, 2013 USPTO Office Action (U.S. Appl. No. 13/618,940)—Our Matter 4908.

* cited by examiner

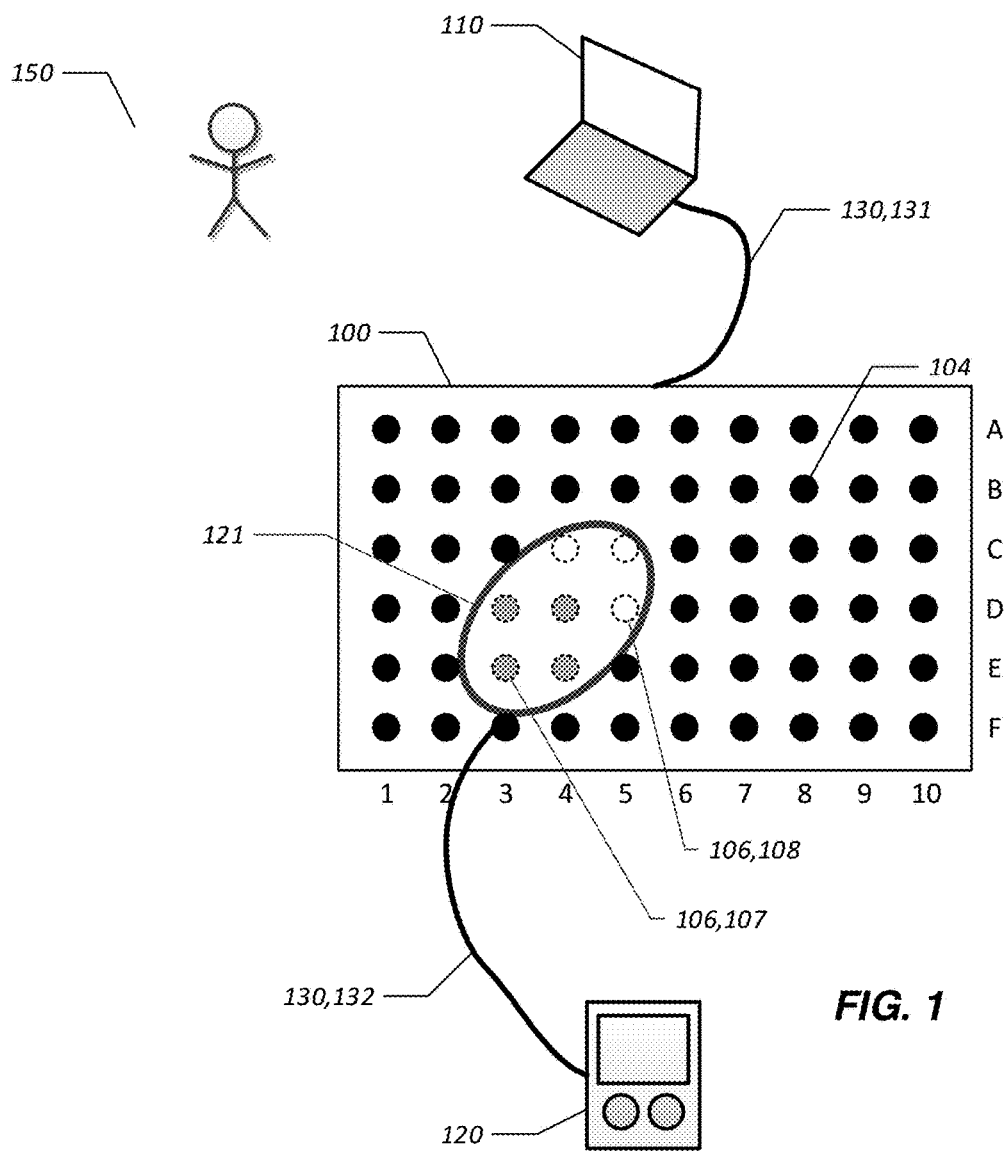
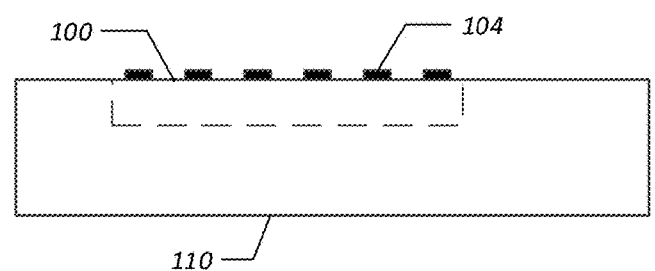
FIG. 1
FIG. 2

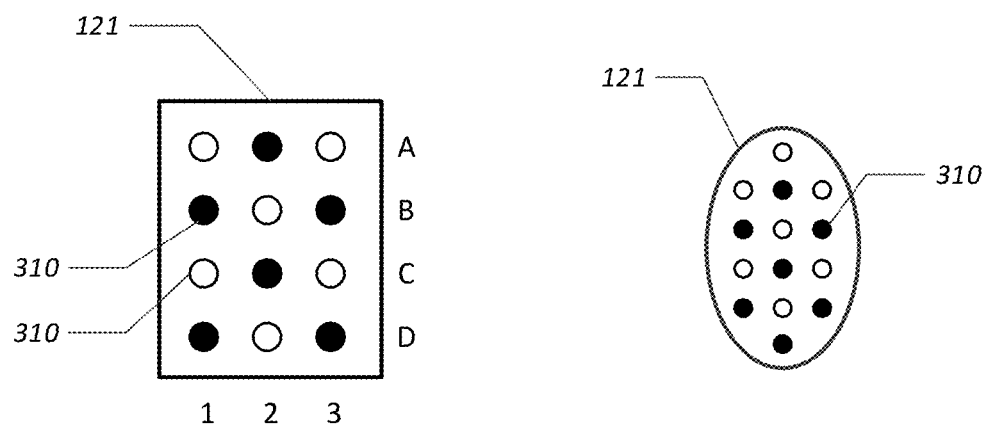
FIG. 3
FIG. 4
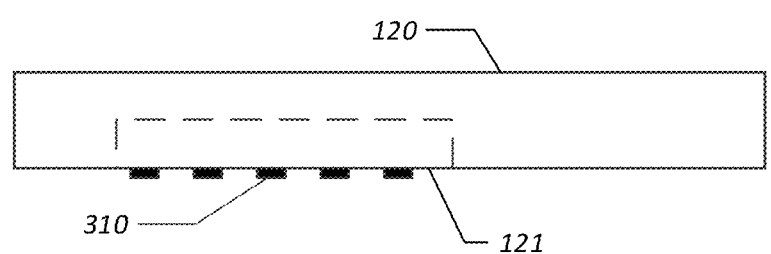
FIG. 5

UNIVERSAL SMART CONNECTION PAD

FIELD OF THE INVENTION

The present invention relates to a pad for connecting electronic devices. More specifically, the present invention relates to a connection pad under control of a smart host.

BACKGROUND OF THE INVENTION

By "storage" we mean tangible computer-accessible electronic storage.

By a "communication system" we mean a combination of hardware devices and logic in software and/or hardware for electronically communicating data in digital form. A communication system might include, for example, a wide-area network such as the Internet; a local-area network (e.g., within a home, business, or school); and/or a personal-area network (e.g., a network implemented with Bluetooth or Infrared Data Association). The term "communication system" is hierarchical, and any combination of communication systems used to transmit data between two smart devices is a communication system. A communication system is assumed to include at least a hardware interface.

By "logic", we mean some combination that includes tangible electronic hardware, and may include software, whereby a processing system executes tasks and makes decisions.

SUMMARY OF THE INVENTION

A universal smart connection pad allows a slave device, such as a mobile electronic device, to be conveniently connected to a host device, such as a computer. Orientation of a connector of the slave upon the pad may be assisted by magnetization. Through the pad, the host may provide services needed by the slave, such as power and communication. The host may adapt the connection to accommodate changing needs of the slave. The host may facilitate recovery and reconnection of a slave that becomes disconnected.

BRIEF DESCRIPTION OF THE DRAWINGS

FIG. 1 is a conceptual diagram illustrating a host device and a slave device adapter connected e an exemplary universal smart connection pad (USCP), viewed from its connecting surface.

FIG. 2 is a side view illustrating a host device that has an integrated USCP.

FIG. 3 illustrates an arrangement of pins in a rectangular slave adapter.

FIG. 4 illustrates an arrangement of pins in an elliptical slave adapter.

FIG. 5 is a side view illustrating a slave device with an integrated slave adapter.

DETAILED DESCRIPTION OF EXEMPLARY EMBODIMENTS

Figure 6:
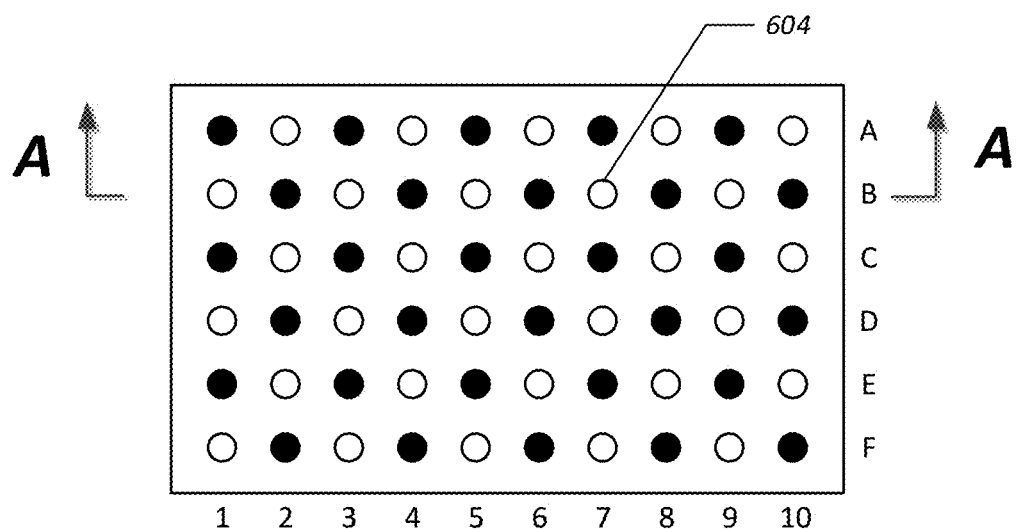
FIG. 6 illustrates an arrangement of magnetic polarities of pins in a USCP.

This description provides embodiments of the invention intended as exemplary applications. The reader of ordinary skill in the art will realize that the invention has broader scope than the particular examples described here. It should be noted from the outset that the drawings, and the elements depicted by the drawings, are intended to illustrate concepts, and may not be to scale. Generally, reference numbers are keyed to the drawing of first appearance. For example, reference number 220 would appear first in FIG. 2; and 460, in FIG. 4. Each such reference will be described at least once, ordinarily in connection with the figure of first appearance. For clarity, a given reference number that appears in a second figure will not necessarily be described a second time.

FIG. 1 is a conceptual diagram illustrating a host 110 device and a slave 120 device connected through an exemplary universal smart connection pad (USCP) 100 and an exemplary slave adapter 121. The host 110 and slave 120 are both electronic devices. A host 110 might be, for example, a laptop computer or a tablet computer. A slave 120 might be, for example, a mobile device, a camera, a video recorder, or a computer. More generally, a host 110 might be any type of electronic device; similarly, for a slave 120. The connection through the USCP 100 between the host 110 and the slave 120 facilitates transfers between them. A transfer might be power or "data". By data, we mean anything that has information content, such as text, audio, video, instructions, signals, or software, whether in analog or digital form, alone or in combination. Data includes any handshaking done between host 110 and slave 120 regarding a transfer. Multiple transfers might be occurring over a given interval. Transfers are done between pins 104 of the pad 100 that are mated with slave pins 310 of the slave adapter 121.

Figure 8:
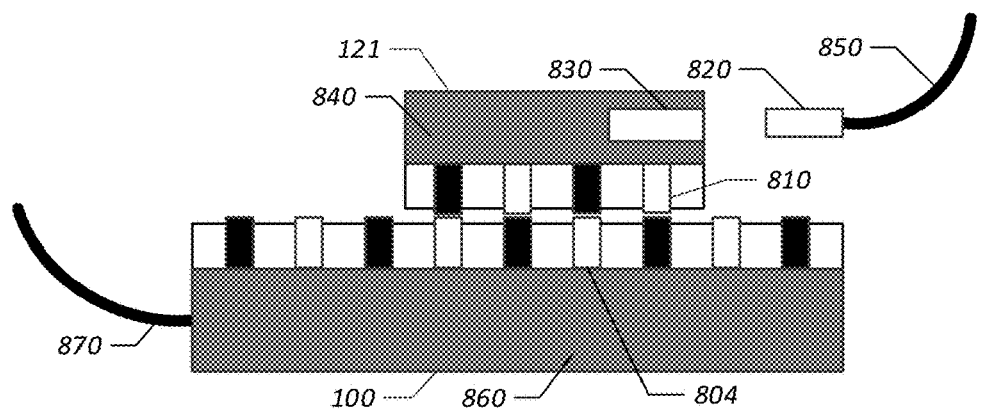
FIG. 8 illustrates an exemplary cross section through a slave adapter mated with a USCP.

In the type of embodiment shown in FIG. 1, pad 100 is in a separate housing from host 110. In FIG. 1, host 110 connects to pad 100 with a cable 131. This cable 131 might connect to the host 110 with a pair of mating connectors, making the cable 130 convenient for a user to disconnect from the host 110; alternatively, the end of the cable 131 might be integrated into the host 110, designed to prevent separation. Similarly, the connection between the cable 131 and the pad 100 might be integrated into the pad 100 or be separable using a pair of mating connectors of the pad 100 and cable 131. Mating-pair and integrated types of connectors are illustrated by FIG. 8, which is described in more detail below.

The slave 120 connects to the pad 100 with a slave adapter 121. Similar to connections between the cable 131 and the host 110, connections between the cable 132 and the slave 120 might be integrated into the slave 120, or use mating pairs of connectors; likewise, for connections between the cable 132 and the slave adapter 121.

FIG. 2 shows a side view of an embodiment, in which the pad 100 is integrated into the housing of a host 110, exposed along a surface. In such embodiments, an external cable linking the host 110 and pad 100 is not required. Analogously, as illustrated by FIG. 5, a slave adapter 121 might be integrated into a slave 120, eliminating the need for a slave external connecting cable.

A slave adapter 121 makes physical contact with the pad 100 to electrically connect the slave 120 to the host 110. As shown in FIG. 1, the pad 100 has pins 104 exposed on one of its surfaces. The pins 104 might protrude slightly beyond the surface of the pad 100, as illustrated by FIG. 2. Alternatively, the exposed ends of the pins 104 might be recessed slightly, or flush with the surface. Preferably, all pins 104 will be uniform in their elevation relative to the connecting surface. Similarly, as illustrated by FIG. 5, the slave adapter 121 has slave pins 310 exposed on one of its surfaces; such slave pins 310 might be raised, lowered, or flush with respect to that connecting surface. Preferably, all slave pins 310 will be uniform in this regard.

Preferably, the pad 100 will have a rectangular shape as illustrated by FIG. 1. In this case, the pins 104 are equally-spaced in two dimensions in a rectangular grid. With some pad 100 shape other than a rectangle, the grid is still rectangular, but will be truncated by the shape of the pad 100. The pins 104 shown in FIG. 1 are preferably circular when viewed from above the surface, but they might have other shapes, such as diamond, square, or hexagon. Like the pins 104, the slave pins 310 are also arranged into a rectangular grid, with the same equal spacing as the FIG. 1. FIG. 3 illustrates a view of a pin-surface grid of a rectangular slave adapter 121; FIG. 4, an elliptical slave adapter 121, in which the rectangular grid is truncated by the overall shape of the slave adapter 121. Preferably, the pad 100 will have at least 4 pins in each direction.

Rows of pins 104 in the pad 100 in FIG. 1 are labeled with letters; columns, with numerals. Labeled pin 104 'B7' exemplifies this system. Magnetism is used to automatically orient the slave adapter 121 into a functional position, as facilitated by the same equal spacing of slave pins 310 and pins 104. Both pins 104 and the slave pins 310 are magnetized. Magnetism of the pins 104 might be either natural magnetism, or magnetism induced electronically by the host 110. The slave pins 310 are preferably naturally magnetized, but in some embodiments, their magnetism might be induced by the slave 120.

Figure 7:
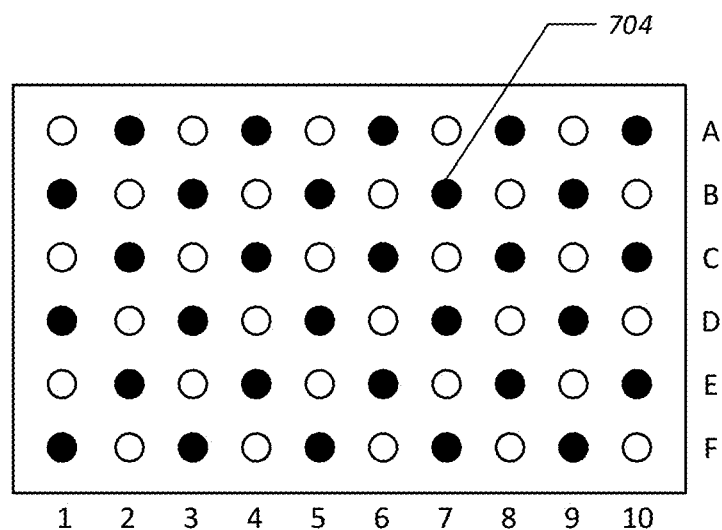
FIG. 7 illustrates an alternative configuration of magnetic polarities of pins in a USCP.

Magnets in the pad 100 orient the slave adapter 121 into an optimal position for transfer of power and/or data between the host 110 and the slave 120. FIG. 6 shows an illustrative arrangement of polarities of a grid of pins 104 in a USCP 100. Filled pins 104 have positive polarity; empty ones, negative. Polarities alternate between adjacent pins 104. FIG. 7 shows a reversed arrangement of the same pad 100. In FIG. 6, pin B7 604 is positive; in FIG. 7 the same pin, pin B7 604, is negative. As shown in FIG. 8, which is a cross-section through a pad 100 and a slave adapter 121, positive slave pins 310 will be attracted to and align with negative pins 104, and conversely. The cross-sectional view of FIG. 8 illustrates how positively-charged pins 104 connect with negatively-charged slave pins 310.

Figure 9:
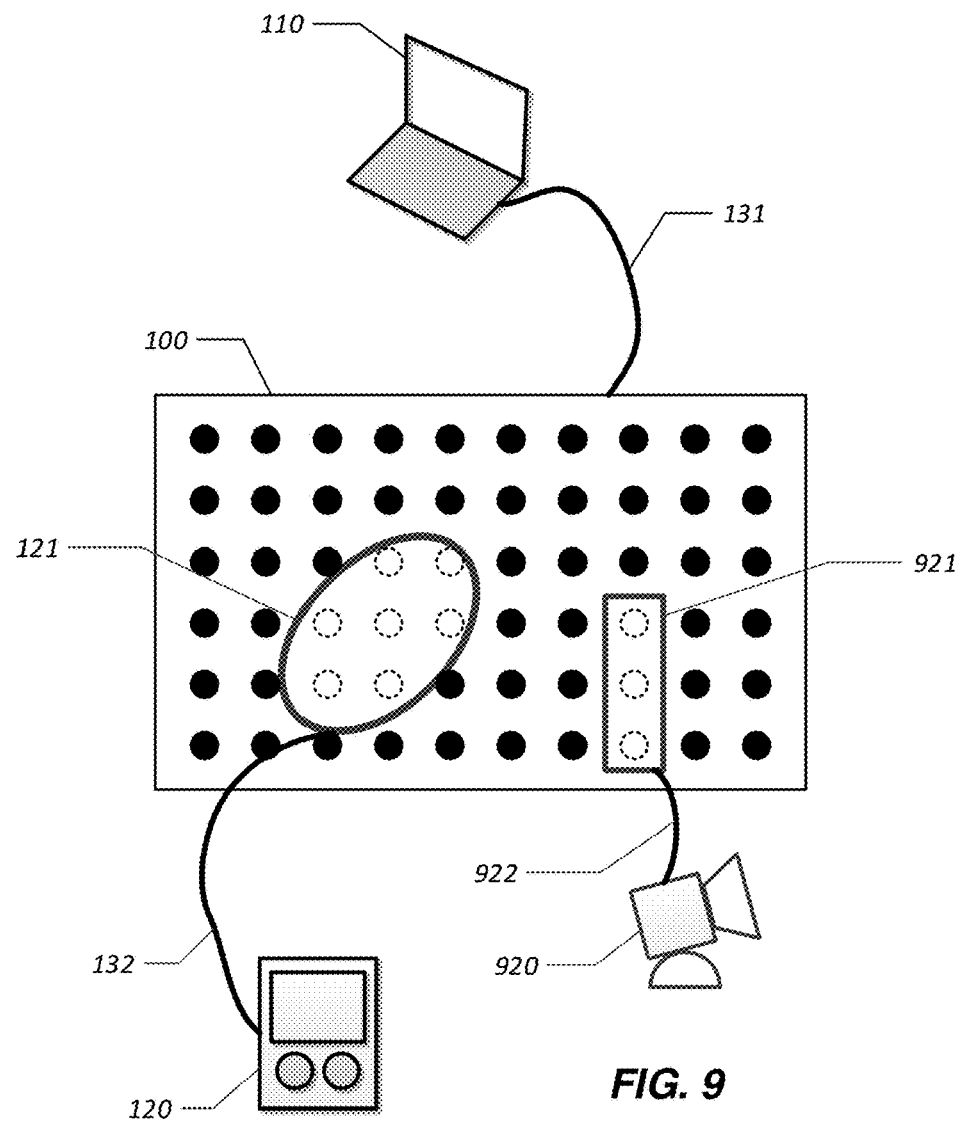
FIG. 9 is a conceptual diagram illustrating a host device and multiple slave devices connected through an exemplary USCP.

In both FIG. 1 and FIG. 8, pins 104 either connected to corresponding slave pins 310 or not. Preferably, all the slave pins 310 are connected slave pins 106, but in some embodiments, the slave adapter 121 might straddle a boundary of the pad 100 and still have enough connected slave pins 106 for the connection to work. Preferably, the pin grid of the pad 100 is sufficiently large so that a slave adapter 121 might be attached to the pad 100 at a variety of locations, as shown in FIG. 1 and FIG. 8. In other words, the pin-dimensions of the pad 100 should as a minimum be larger than those of the largest slave adapter 121 that the pad 100 is intended to accommodate. The locations unused by a first slave 120 can be used so that the host 110 can mate with other slave 120 devices. FIG. 9 shows a second slave 920, connected to the pad 100 by cable 922 and adapter 921.

The connected slave pins 106 fall into two categories—they are either mated slave pins 107 or reserved slave pins 108. The mated slave pins 107 (shown as filled in FIG. 1) are actively participating in the connection, exchanging power or data. The reserved slave pins 108 (shown as hollow) are inactive, either because they are presently unneeded to transfer data, or because they are defective or have failed. During a given interaction or exchange between a host 110 and a slave 120, host connection management logic 1100 and/or slave connection management logic 1300 might change the role of a given slave pin 310 from mated to reserved, or conversely. Moreover, the position of the slave adapter 121 on the pad 100 can change during an interaction.

Figure 10:
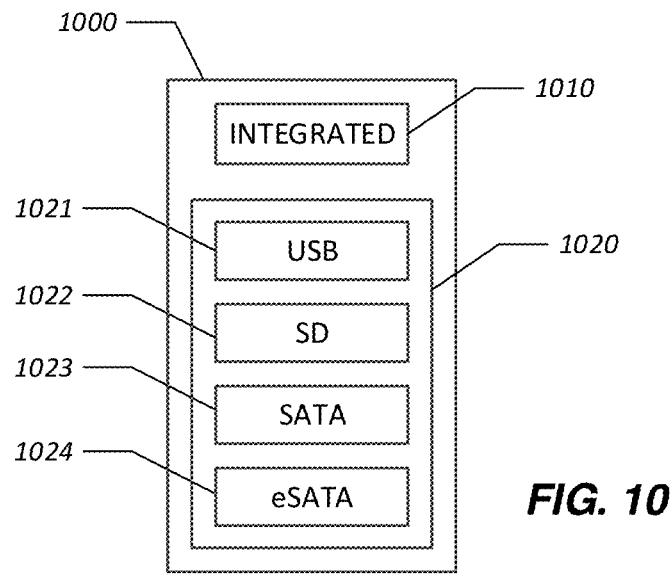
FIG. 10 is a block diagram illustrating exemplary types of connections whereby a host device or a slave device might access a USCP.

In the embodiment illustrated by FIG. 1, the pad 100 is in a hardware housing separate from both the host 110 and the slave 120. The host 110 is connected to the pad 100 by a cable 130; specifically, cable 131. The slave 120 is connected to the slave adapter 121 by a cable 130; specifically, cable 132. In other embodiments, the pad 100 may be integrated into the host 110; and/or the slave adapter 121 may be integrated into the slave 120. FIG. 10, which is a block diagram illustrating exemplary types of connections whereby a host 110 device or a slave 120 device might access a USCP 100. The host 110 may be either connected with an integrated connection 1010, or through an external port 1020 of the host 110 and a corresponding cable; similarly, for the slave 120. Such an external port 1020 might be, for example, a USB port 1021, a SD port 1022, a SATA port 1023, or an eSATA port 1024. Other examples include Ethernet, HDMI, analog audio/video, digital audio/video, COAX, Lightening, Thunderbolt, and FireWire.

Figure 11:
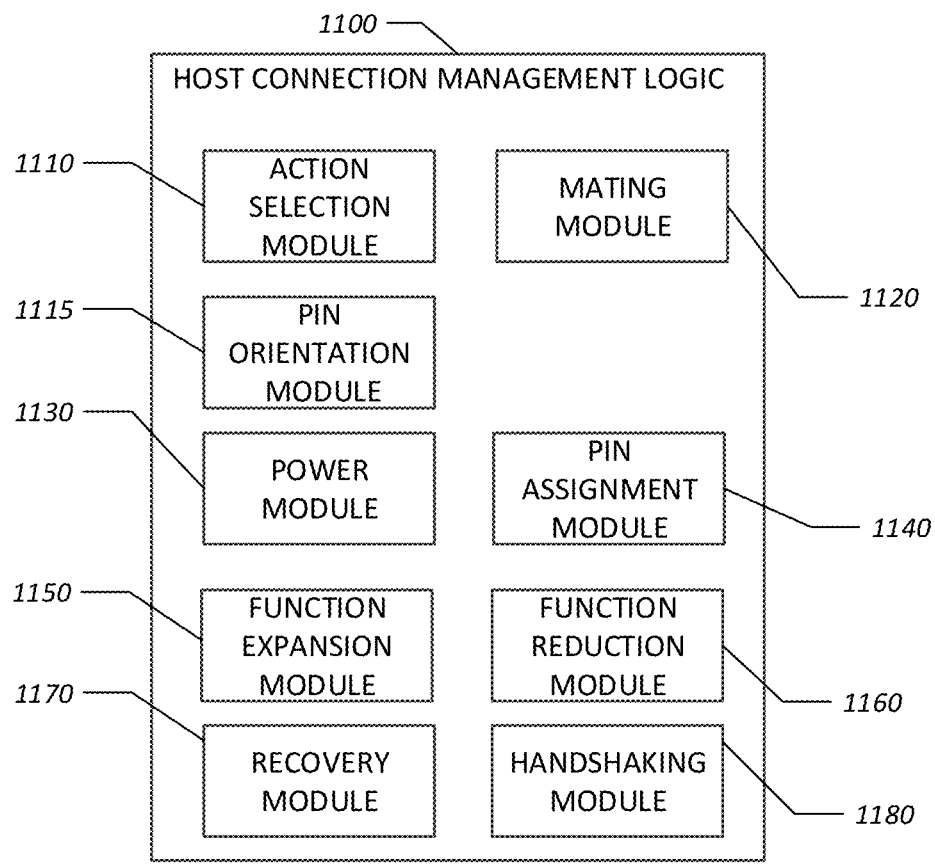
FIG. 11 is a block diagram illustrating exemplary functions of host connection manager logic in an exemplary USCP.
Figure 13:
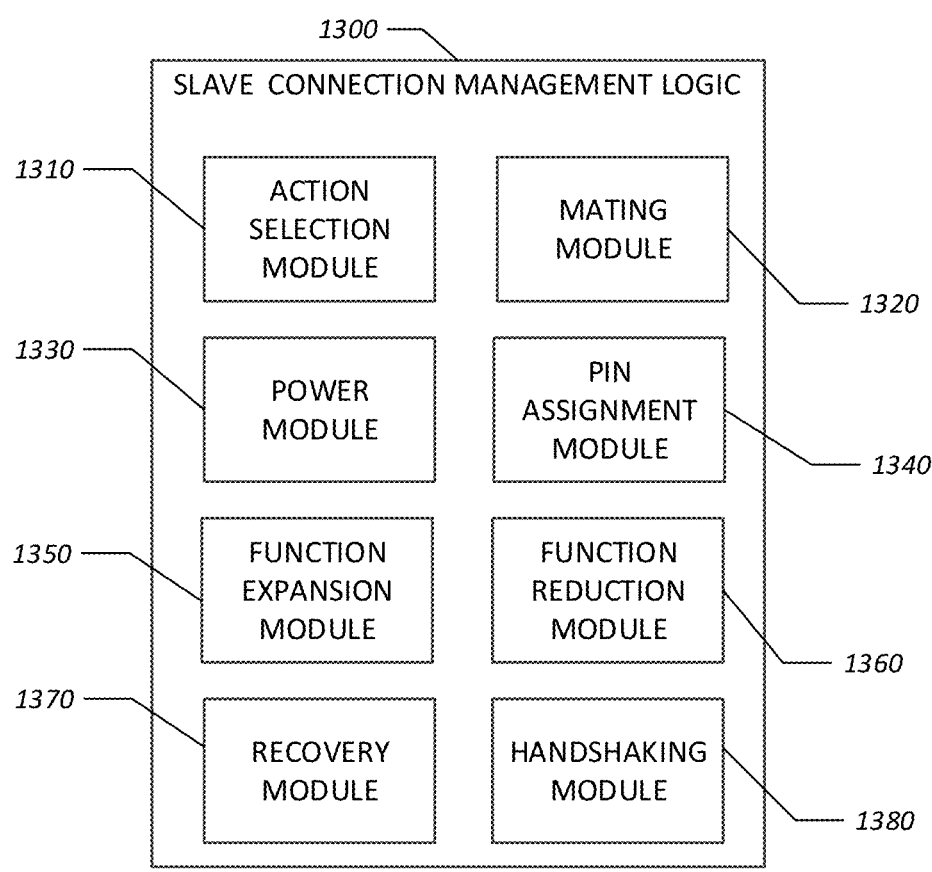
FIG. 13 is a block diagram illustrating exemplary functions of slave connection manager logic for a slave that is compatible with a USCP.

The smart connection between the host 110 and the slave 120 through the pad 100 is managed for the host 110 by host connection management logic 1100, illustrated by FIG. 11. For the slave 120, the connection is managed by slave connection management logic 1300, illustrated by FIG. 13. Functionality, and corresponding hardware/software, of host connection management logic 1100 may be split in any combination between the host 110 and the pad 100. Placing more functionality in the pad 100 means that one pad 100 might be compatible with many hosts. On the other hand, a host 110 with a processing system may be able to easily accommodate a relatively passive and unintelligent pad 100, possibly with a simple software application installation on the host 110. Analogously, functionality, and corresponding hardware/software, of slave connection management logic 1300 may be split in any combination between the slave 120 and the slave adapter 121; in this case, placing as much functionality on the slave adapter 121 as possible is preferable.

In the illustrative embodiment of FIG. 8, the pad 100 has module 860 where some or all of the host connection management logic 1100 might be housed. Similarly, the slave adapter 121 has module 840 where some or all of the slave connection management logic 1300 might be housed. As a minimum, module 860 provides electrical connections between the pins 104 and the cable 131; similarly, module 840 provides electrical connections between the slave pins 310 and the cable 132.

Figure 15:
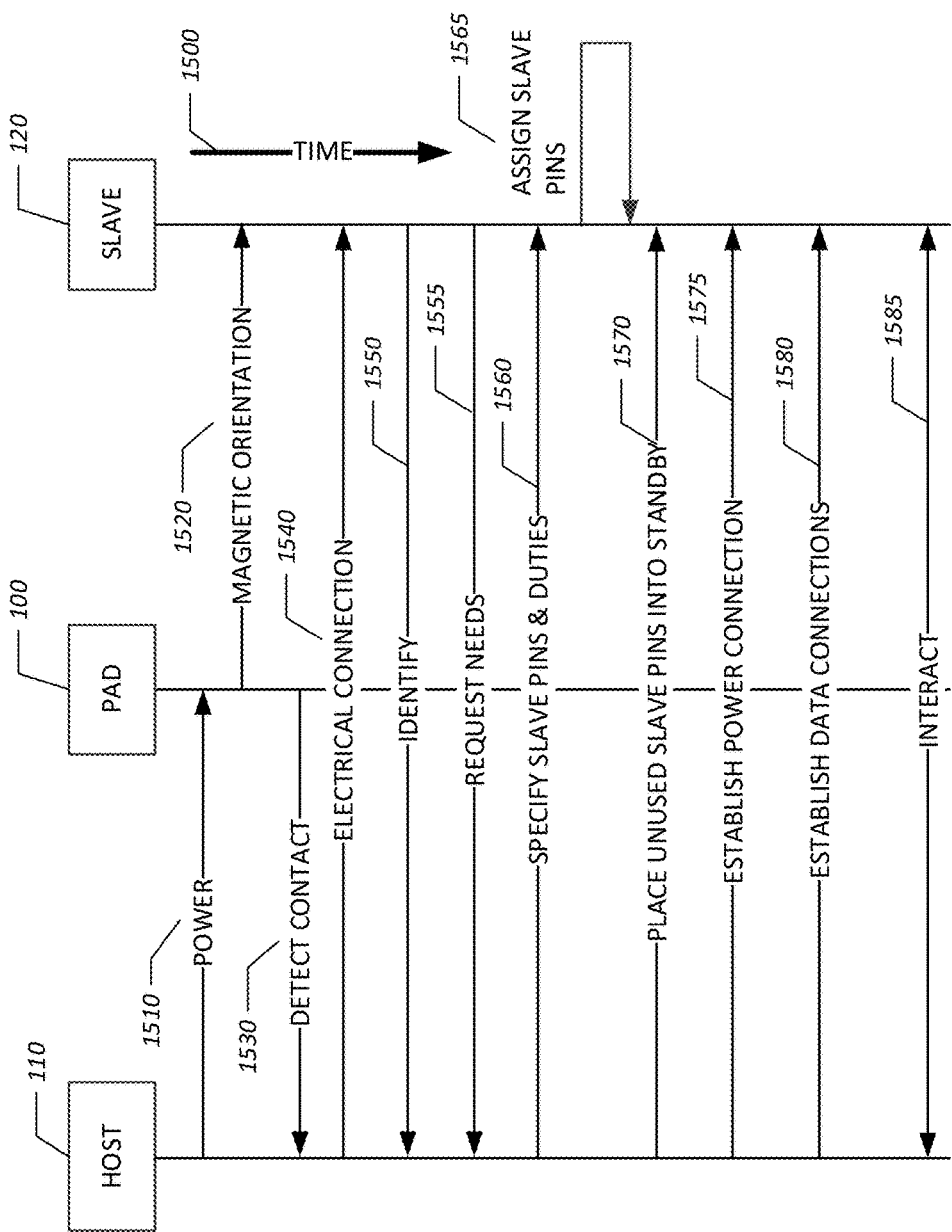
FIG. 15 is a sequence diagram illustrating exemplary mating module logic in an exemplary USCP.
Figure 16:
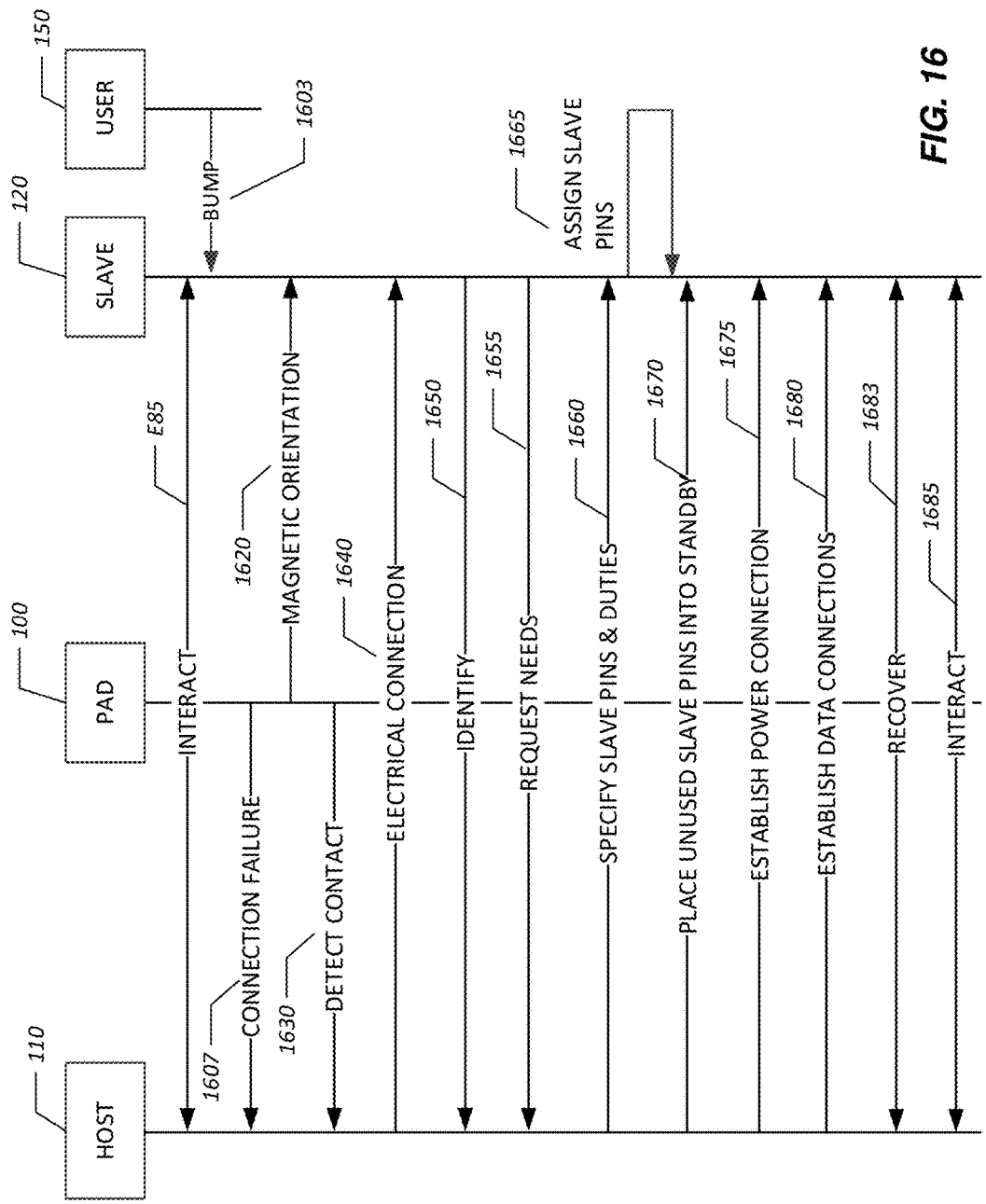
FIG. 16 is a sequence diagram illustrating exemplary recovery module logic in an exemplary universal smart connection pad.
Figure 17:
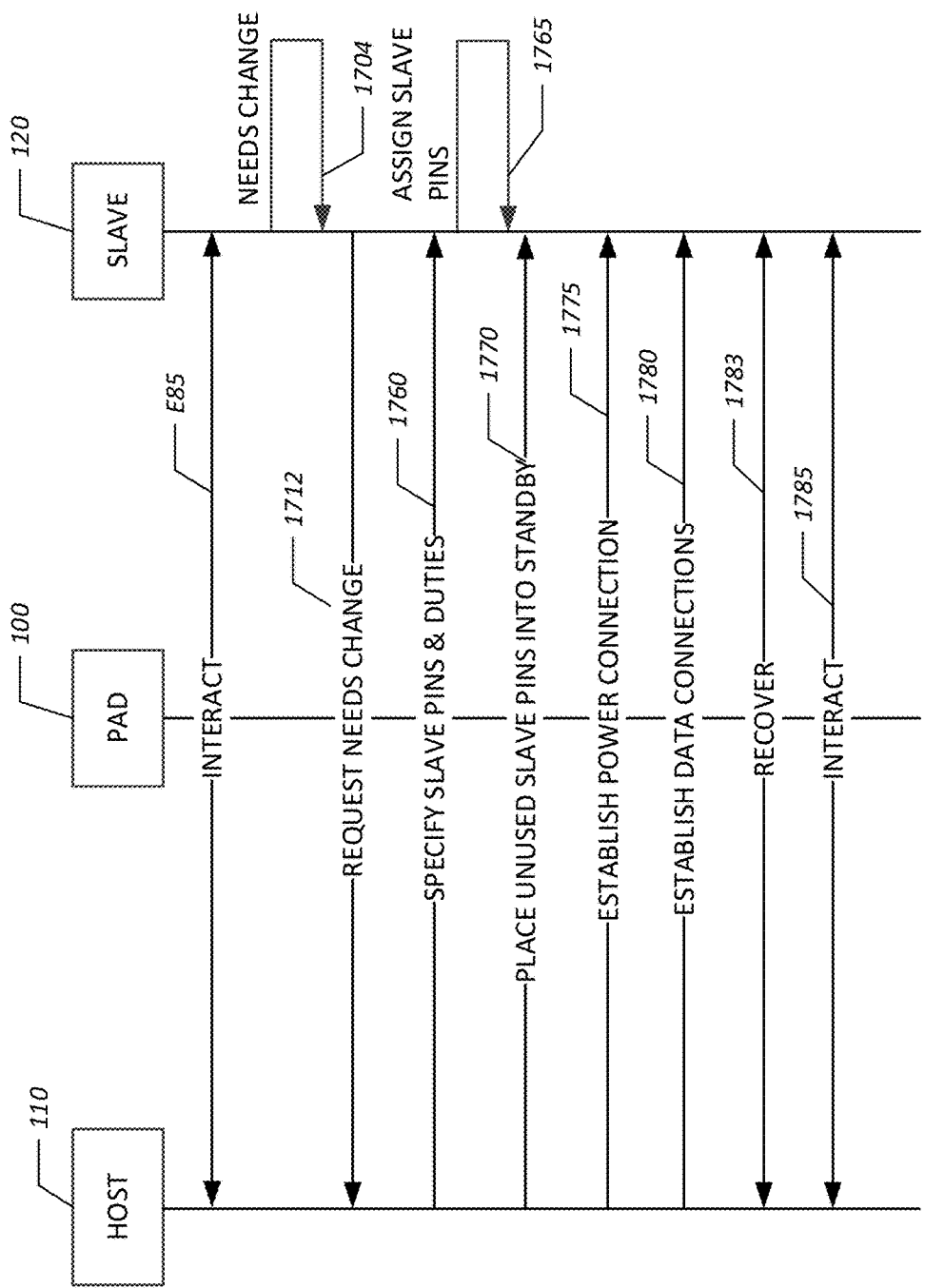
FIG. 17 is a sequence diagram illustrating exemplary pin reassignment module logic in an exemplary universal smart connection pad.

The host connection management logic 1100 may include an action selection module 1110. The action selection module 1110 considers, given the current state of the pad 100, whether each of the possible other action modules should be executed, and if so, initiates execution of that module. The host connection management logic 1100 may include a pin orientation module 1115 that manages magnetization of pins 104, causing an attached slave 120 device to assume a workable orientation. The host connection management logic 1100 may include a mating module 1120, a power module 1130, a pin assignment module 1140, a function expansion module 1150, a function reduction module 1160, a recovery module 1170, and/or a handshaking module 1180. Exemplary logic of a mating module 1120 and a pin assignment module 1140 is illustrated by FIG. 15. Exemplary logic of a pin assignment module 1140, a handshaking module 1180, and a recovery module 1170 is illustrated by FIG. 16. Exemplary logic of a pin assignment module 1140, a function expansion module 1150, a function reduction module 1160, and a 17 is illustrated by FIG. 17.

The modules of the slave connection management logic 1300 are required to collaborate with their counterparts to facilitate the transfers. The slave connection management logic 1300 may include an action selection module 1310, a mating module 1320, a power module 1330, a pin assignment module 1340, a function expansion module 1350, a function reduction module 1360, a recovery module 1370, and/or a handshaking module 1380. 15-FIG. 17 illustrate applications of these modules in initiating interactions with the host 110, and responding to interactions initiated by the host 110.

Figure 12:
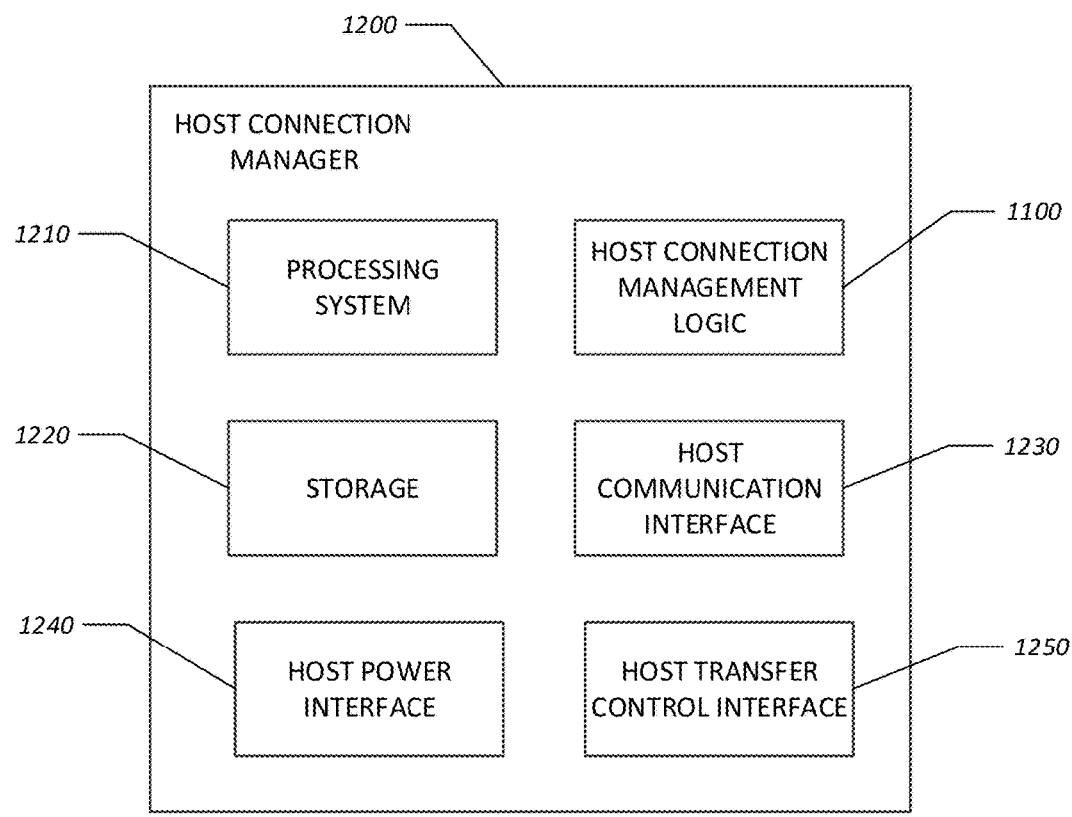
FIG. 12 is a block diagram illustrating exemplary components of a host connection manager in an exemplary USCP.

FIG. 12 is a block diagram illustrating exemplary components of a host connection manager 1200 in an exemplary USCP 100. The host connection manager 1200 executes the host connection management logic 1100. The processing system 1210 includes at least one processor, housed in either the host 110, the pad 100, or one or more in each. Similarly, storage 1220 may be housed in either the host 110, the pad 100, or in each. The processing system 1210, storage 1220, and the four interfaces all include hardware electronic components; the host connection management logic 1100 may include hardware components and may include software instructions, some or all of which might be accessed from the storage 1220. The host communication interface 1230 is an interface between the host 110 and the pad 100 through which the host 110 may communicate electronically with the slaves 120 and with the pad 100 itself. The host power interface 1240 is an interface through which the host 110 may provide power to the pad 100, and in some embodiments, to slaves 120. The host transfer-control interface 1250 is an interface through which the host 110 communicates with the slave 120, through the pad 100 and slave adapter 121, to coordinate and monitor transfers of power and/or data, including handshaking.

Figure 14:
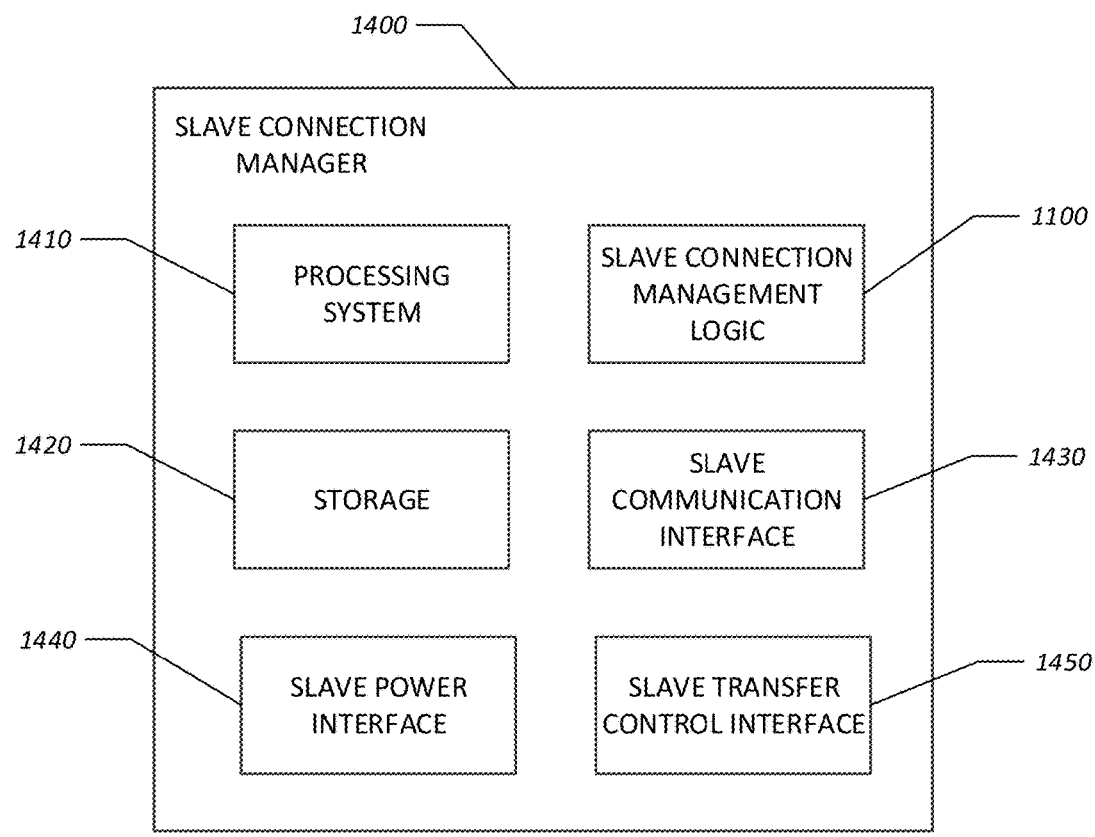
FIG. 14 is a block diagram illustrating exemplary components of a slave connection manager for a slave that is compatible with a USCP.

FIG. 14 is a block diagram illustrating exemplary components of a slave connection manager 1400 in an exemplary USCP 100. The slave connection manager 1400 executes the slave connection management logic 1300. The processing system 1410 includes at least one processor, housed in either the host 110, the pad 100, or one or more in each. Similarly, storage 1420 may be housed in either the host 110, the pad 100, or in each. The processing system 1410, storage 1420, and the four interfaces all include hardware electronic components; the slave connection management logic 1300 may include hardware components and may include software instructions, some or all of which might be accessed from the storage 1420. The slave communication interface 1430 is an interface between the host 110 and the pad 100 through which the host 110 may communicate electronically with the slaves 120 and with the pad 100 itself. The slave power interface 1440 is an interface through which the host 110 may provide power to the pad 100, and in some embodiments, to slaves 120. The slave communication interface 1430 is an interface through which slaves 120 may communicate electronically with the host 110 and with the pad 100 itself. The slave power interface 1440 is an interface through which slaves 120 may receive power from the pad 100, and in some embodiments, ultimately from the host 110. The slave transfer-control interface 1450 is an interface through which the slave 120 communicates with the host 110, through the slave adapter 121 and pad 100, to coordinate and monitor transfers of power and/or data, including handshaking. Preferably, as much of the slave connection manager 1400 as possible is housed in the slave adapter 121, and as much of the slave connection management logic 1300 as possible is executed by the slave adapter 121. Preferably, the slave 120 itself is unaware of the details of the connection.

The handshaking module 1180 and the handshaking module 1380 may communicate regularly to monitor the status of any transfers of power or data, and to initiate any appropriate corrective action. Such handshaking might be done using one or more otherwise unassigned slave pins 310, a dedicated slave pin 310, or might be piggybacked on a data or power transfer pin.

FIG. 15-17 are sequence diagrams (also known as swim lane diagrams) that illustrate exemplary host connection management logic 1100 of an exemplary USCP 100. FIG. 15 is typical of these swim-lane diagrams. Across the top of the diagram, system components are depicted in boxes; in FIG. 15, the components are the host 110, the pad 100, and the slave 120. As indicated by notation 1500, time increases down the page. Under each box representing a respective component is a timeline; in FIG. 15, the timelines are host timeline 1501, pad timeline 1502, and slave timeline 1503. An arrow between two timelines indicate interactions between the corresponding system components, where the component transfers something to, communicates with, or senses something from other component. A single-headed arrow indicates a one-way interaction; a double-headed arrow, two-way. An arrow from a timeline to itself indicates an action taken by the corresponding system component at that point in the sequence.

FIG. 15 is a sequence diagram illustrating exemplary mating module 1120 logic in an exemplary USCP 100. In FIG. 15, when the pad 100 has no active connections, host 110 still provides 1510a low level of power to the pad 100. This power might be required for a slave adapter 121 to respond to contact, or for the host 110 to detect presence of a slave adapter 121. Magnetic attraction of the pins 104 to the slave pins 310 causes 1520 the slave adapter 121 of the slave 120 to attain a workable orientation. The host 110 detects 1530 contact with the slave adapter 121, and establishes 1540 with the slave 120 through the slave adapter 121. The slave 120 then identifies 1550 itself to the host 110.

Such identification may include type of the slave 120, the type of the slave adapter 121, and the number of connections available. The slave 120 then requests 1555 what it needs from the host 110, such as the types of connections, the power requirements, assignments of slave pins 310 and their duties, which pins are reserved, and how handshaking will occur. The host 110 responds 1565, choosing pin assignments. The slave 120 complies 1565 by assigning slave pins 310 as directed. The host 110 places 1570 unused slave pins 310 on standby. The host 110 establishes 1575 the power connection. The host 110 establishes 1580 the data connection. At this point, interaction begins 1585 between the host 110 and the slave 120.

FIG. 16 is a sequence diagram illustrating recovery from a connection failure. Initially, the host 110 and slave 120 are interacting 17, as in the last step of FIG. 15. Something disturbs the system; for example, a user 150 might bump 1603 the slave adapter 121. The host 110 detects 1607 the connection failure at the pad 100. The remaining steps (1625-1685) follow their counterparts (1520-1585) in FIG. 15, except that here there is an additional step of recovery 1675 from interruption of the data transfer.

FIG. 17 is a sequence diagram that deals with changes to the system once interaction 1585 between the host 110 and slave 120 has already been taking place. In the embodiment shown, the slave 120 determines for itself 1704 that a change in the interaction is needed. (In other embodiments, a needs change might be initiated by the pad 100, by the host 110, or by the slave adapter 121.) The slave 120 requests 1712 a change. The remainder steps (1560-1585) follows their counterparts (1660-1685) in FIG. 16. The optional recovery step 1782 might or might not be needed, depending upon circumstances of the change.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A system, comprising:
 a) a processing system that includes a processor;
 b) a connection pad, which includes
  (i) a set of pins, which
   (A) are arranged equally-spaced in a grid having a plurality of rows and a plurality of columns,
   (B) have magnetic polarities that alternate within a row in the plurality of rows, and alternate within a column in the plurality of columns,
   (C) are equally-spaced within a row in the plurality of rows, and equally-spaced within a column in the plurality of column, and
   (D) through a first subset of which the connection pad can electronically connect to a first slave device and communicate electronically with the first slave device,
  (ii) a first hardware interface through which the pad can electrically connect to a host device and communicate electronically with the host device, and
 c) the host device, which includes a second hardware interface through which the host device can electrically connect to the connection pad and communicate electronically with the connection pad,
 d) connection management logic, which includes
  (i) a power module, under control of the processing system, whereby the host device provides power through a first subset of pins in the set of pins, to the first slave device, which is external to the host device,
  (ii) a mating module, under control of the processing system, whereby the host device receives identification information from the first slave device and establishes and maintains electronic data communication with the first slave device through a second subset of pins in the set of pins, and the first and the second hardware interfaces, and
  (iii) a pin assignment module, under control of the processing system, whereby the host device transmits pin assignment information to the first slave device through a third subset of pins in the set of pins, and the first and the second hardware interfaces, wherein the first, second, and third subsets of pins are not necessarily pairwise mutually exclusive.

2. The system of claim 1, wherein the connection management logic further includes
 (iv) a handshaking module, under control of the processing system, whereby the host device transmits to, and receives from, the first slave device, through the connection pad, monitoring information pertaining to a progress of a data transfer between the host device and the first slave device.

3. The system of claim 1, wherein the connection management logic further includes
 (iv) a function change module, under control of the processing system, whereby the host device receives through the connection pad, and then takes action to accommodate, a request from the first slave device to change data, power, or handshaking services provided by the host device to the first slave device.

4. The system of claim 1, wherein the connection management logic further includes
 (iv) a recovery module, under control of the processing system, whereby the host device takes action to recover from an interruption in communication between the host device and the first slave device.

5. The system of claim 1, wherein magnetic polarity of the pins in the set of pins is natural magnetic polarity.

6. The system of claim 1, wherein magnetic polarity of the pins in the set of pins is set electrically by the host device.

7. The system of claim 1, wherein the connection pad is integrated into a housing of the host device.

8. The system of claim 1, wherein at least one of the connection management logic modules is executed by components of the processing system that are located in the connection pad.

9. The system of claim 1, wherein at least one of the connection management logic modules is executed by a set of components of the processing system that are located in the host device.

10. The system of claim 1, wherein the connection pad connects electrically with the first slave device through a first slave adapter, which is attached to the first slave device.

11. The system of claim 1, wherein the connection pad connects electrically with a second slave device through a slave adapter, which is attached to the second slave device.

12. The system of claim 1, wherein the connection pad is included in a housing that is external from a housing of the host device and is connected electrically to the host device by a cable.

13. A method, comprising:
 a) orienting a slave adapter on a connection pad, wherein the pad includes a pad set of magnetized pins arranged in an equally-spaced grid, having a plurality of rows and a plurality of columns, and the slave adapter includes an adapter set of magnetized pins, arranged in a grid having a plurality of rows and a plurality of columns, and having spacing that corresponds to spacing of the pad set;
b) detecting contact by a host device of the slave adapter with the connection pad;
c) establishing an electrical connection through a subset of the pad pins and the adapter pins between a host device, which is electrically connected to the pad, and a slave device, which is electrically connected to the adapter;
d) transmitting by the slave device through the adapter, and receiving by the host device through the pad, information identifying a type of the slave device and requirements of the slave device for communicating with the host device;
e) specifying, by the host device to the slave device, communication assignments of a first mated subset of the adapter pins;
f) establishing data communication between the host device and the slave device through at least one pin in the first mated subset of adapter pins;
g) detecting a failure in communication between the host device and the slave device;
h) magnetically reorienting the slave adapter on the connection pad; and
i) resuming data communication between the host device and the slave device through the pad and adapter.

14. The method of claim 13 wherein data communication between the host device and the slave device after the failure in communication uses a second mated subset of the adapter pins.

15. A method, comprising:
a) orienting a slave adapter on a connection pad, wherein the pad includes a pad set of magnetized pins arranged in an equally-spaced grid, having a plurality of rows and a plurality of columns, and the slave adapter includes an adapter set of magnetized pins, arranged in a grid having a plurality of rows and a plurality of columns, and having spacing that corresponds to spacing of the pad set;
b) detecting contact by a host device of the slave adapter with the connection pad;
c) establishing an electrical connection through a subset of the pad pins and the adapter pins between a host device, which is electrically connected to the pad, and a slave device, which is electrically connected to the adapter;
d) transmitting by the slave device through the adapter, and receiving by the host device through the pad, information identifying a type of the slave device and requirements of the slave device for communicating with the host device;
e) specifying, by the host device to the slave device, communication assignments of a first mated subset of the adapter pins;
f) establishing data communication between the host device and the slave device through at least one pin in the first mated subset of adapter pins; and
g) placing any adapter pins that are not in the first mated subset into a standby mode, wherein the second mated subset includes a pin of the first mated subset that was in standby mode prior to a failure in communication between the host device and the slave device.

16. A method, comprising:
a) orienting a slave adapter on a connection pad, wherein the pad includes a pad set of magnetized pins arranged in an equally-spaced grid, having a plurality of rows and a plurality of columns, and the slave adapter includes an adapter set of magnetized pins, arranged in a grid having a plurality of rows and a plurality of columns, and having spacing that corresponds to spacing of the pad set;
b) detecting contact by a host device of the slave adapter with the connection pad;
c) establishing an electrical connection through a subset of the pad pins and the adapter pins between a host device, which is electrically connected to the pad, and a slave device, which is electrically connected to the adapter;
d) transmitting by the slave device through the adapter, and receiving by the host device through the pad, information identifying a type of the slave device and requirements of the slave device for communicating with the host device;
e) specifying, by the host device to the slave device, communication assignments of a first mated subset of the adapter pins;
f) establishing data communication between the host device and the slave device through at least one pin in the first mated subset of adapter pins;
g) receiving by the host device a request, from the slave through the pad, specifying a change in communication needs of the slave device; and
h) transmitting by the host device to the slave through the pad a change in communication assignments of adapter pins.

17. The method of claim 16, wherein the change assigns more adapter pins to some communication task.

18. The method of claim 16, wherein the change requires that at least one adapter pin alternate between two distinct data communications being during the same time interval.

19. A slave adapter, comprising:
a) a set of adapter pins arranged into at least two rows, pairwise not necessarily of the same length, and two columns, pairwise not necessarily of the same length, wherein pairs of adjacent pins have opposite magnetic polarity;
b) hardware power and communication interfaces to a slave device;
c) a power and a communication connection through a subset of the adapter pins between the slave device and a set of connection pad pins to which the subset of the adapter pins are held in physical contact by magnetic attraction.

* * * * *